(12) United States Patent
Ebbe et al.

(10) Patent No.: US 8,996,643 B2
(45) Date of Patent: Mar. 31, 2015

(54) SYSTEM COMPRISING AT LEAST A MASTER UNIT AND A PLURALITY OF SLAVE UNITS

(75) Inventors: Ulrik Vagn Ebbe, Greve (DK); Henrik Raun Byberg, Allerød (DK); Jeppe Vestergaard, Skjern (DK); Preben Kjærsgaard, Ikast (DK); Thomas Christiansen, Brande (DK)

(73) Assignee: VKR Holding A/S (DK)

( * ) Notice: Subject to any disclaimer, the term of this patent is extended or adjusted under 35 U.S.C. 154(b) by 89 days.

(21) Appl. No.: 11/994,586

(22) PCT Filed: Jul. 4, 2005

(86) PCT No.: PCT/DK2005/000462
§ 371 (c)(1),
(2), (4) Date: Jan. 3, 2008

(87) PCT Pub. No.: WO2007/003185
PCT Pub. Date: Jan. 11, 2007

(65) Prior Publication Data
US 2008/0313299 A1 Dec. 18, 2008

(51) Int. Cl.
*G06F 15/16* (2006.01)
*G06F 15/177* (2006.01)
*H04L 12/24* (2006.01)
(Continued)

(52) U.S. Cl.
CPC ........ *H04L 41/0803* (2013.01); *H04L 12/2803* (2013.01); *H04L 12/282* (2013.01); *H04L 29/12009* (2013.01); *H04L 29/12594* (2013.01); *H04L 61/30* (2013.01); *H04W 8/26* (2013.01);
(Continued)

(58) Field of Classification Search
CPC .................................................. H04L 12/2803
USPC ........................................................ 709/208
See application file for complete search history.

(56) References Cited

U.S. PATENT DOCUMENTS 3,810,101 A * 5/1974 Avery ........................... 710/110
4,200,862 A * 4/1980 Campbell et al. ........ 340/310.11
(Continued)

FOREIGN PATENT DOCUMENTS

CN 1399444 2/2003
CN 1502094 6/2004
(Continued)

OTHER PUBLICATIONS

International Search Report; PCT/DK2005/000462; Mar. 16, 2006.
(Continued)

*Primary Examiner* — Gerald Smarth
(74) *Attorney, Agent, or Firm* — Cantor Colburn LLP (57) ABSTRACT

System having at least one master unit and a plurality of slave units, the master unit and the slave unit including means for performing communication via radio frequency channels. The at least one master unit includes means for transmitting control signals to the slave units, the slave units each being provided with a unique address and each being associated with a controllable device. The at least one master unit includes means for configuring the slave units addressable by the master unit in a number of sectors, and the master unit has further means for allocating predefined identifications to the slave units. Further, the master unit has display means, by means of which the predefined identifications may be displayed.

18 Claims, 5 Drawing Sheets

(51) Int. Cl.
*H04L 12/28* (2006.01)
*H04L 29/12* (2006.01)
*H04W 8/26* (2009.01)
*H04W 84/20* (2009.01)

(52) U.S. Cl.
CPC ..... *H04L 41/0893* (2013.01); *H04L 2012/2841* (2013.01); *H04W 84/20* (2013.01)
USPC .......................................... 709/208; 709/220

(56) References Cited

U.S. PATENT DOCUMENTS

| | | | |
|---|---|---|---|
| 4,825,200 A | 4/1989 | Evans et al. | |
| 5,187,472 A | 2/1993 | Hart et al. | |
| 5,410,326 A * | 4/1995 | Goldstein | 348/734 |
| 5,544,037 A * | 8/1996 | Luger | 700/17 |
| 5,555,436 A | 9/1996 | Gavish | |
| 5,646,608 A | 7/1997 | Shintani | |
| 5,706,846 A | 1/1998 | Sutton | |
| 6,021,429 A * | 2/2000 | Danknick | 709/208 |
| 6,229,433 B1 | 5/2001 | Rye et al. | |
| 6,297,746 B1 | 10/2001 | Nakazawa et al. | |
| 6,476,825 B1 * | 11/2002 | Croy et al. | 715/716 |
| 6,563,430 B1 | 5/2003 | Kemink et al. | |
| 6,686,838 B1 | 2/2004 | Rezvani et al. | |
| 6,747,590 B1 * | 6/2004 | Weber | 341/176 |
| 6,785,711 B1 | 8/2004 | Motoyama et al. | |
| 6,791,467 B1 | 9/2004 | Ben-Ze'ev | |
| 6,812,852 B1 | 11/2004 | Cesar | |
| 6,985,750 B1 | 1/2006 | Vicknair et al. | |
| 7,127,270 B2 | 10/2006 | Sinclair | |
| 7,728,997 B2 * | 6/2010 | Koike et al. | 358/1.15 |
| 2002/0101357 A1 * | 8/2002 | Gharapetian | 340/825.69 |
| 2002/0120669 A1 * | 8/2002 | Yanovsky | 709/201 |
| 2003/0047999 A1 | 3/2003 | Chang | |
| 2003/0103088 A1 * | 6/2003 | Dresti et al. | 345/835 |
| 2003/0234737 A1 | 12/2003 | Nelson et al. | |
| 2004/0070516 A1 * | 4/2004 | Nielsen | 340/825.72 |
| 2004/0208588 A1 | 10/2004 | Colmenarez et al. | |
| 2004/0249903 A1 * | 12/2004 | Ha et al. | 709/208 |
| 2005/0044161 A1 * | 2/2005 | Fujita | 709/208 |
| 2005/0094610 A1 * | 5/2005 | de Clerq et al. | 370/338 |
| 2005/0143009 A1 * | 6/2005 | Nielsen et al. | 455/67.11 |
| 2005/0289224 A1 * | 12/2005 | Deslippe et al. | 709/208 |
| 2006/0140170 A1 * | 6/2006 | Dorner | 370/352 |
| 2006/0171453 A1 | 8/2006 | Rohlfing et al. | |
| 2006/0174010 A1 * | 8/2006 | Deshpande | 709/227 |
| 2006/0224711 A1 * | 10/2006 | Engel et al. | 709/223 |

FOREIGN PATENT DOCUMENTS

| | | |
|---|---|---|
| CN | 1466108 | 7/2004 |
| EP | 1038496 A1 | 9/2000 |
| EP | 1 340 198 | 9/2003 |
| JP | 9158636 | 6/1997 |
| JP | 11214182 A | 8/1999 |
| JP | 2004151947 A | 5/2004 |
| JP | 2004515947 | 5/2004 |
| WO | 0008548 | 2/2000 |
| WO | 02/47038 | 6/2002 |
| WO | WO 02/47038 | 6/2002 |
| WO | 02054225 A1 | 7/2002 |
| WO | 03042480 A2 | 5/2003 |
| WO | 2004064329 | 7/2004 |
| WO | WO 2004/064329 | 7/2004 |
| WO | WO 2005/041146 | 5/2005 |

OTHER PUBLICATIONS

International Search Report; International Application No. PCT/DK2006/000388; Date of mailing: Nov. 7, 2006; 3 pages.
International Search Report; International Application No. PCT/DK2005/000464; Date of mailing: Mar. 15, 2006; 4 pages.
International Search Report; International Application No. PCT/DK2005/000466; Date of mailing: Mar. 16, 2006; 2 pages.
JP Patent Application No. 2008-518625, Office Action dated Dec. 14, 2010.
JP Patent Application No. 2008-518629, Office Action dated Dec. 14, 2010.
Non-Final Office Action dated Oct. 7, 2014, U.S. Appl. No. 11/994,726.
U.S. Appl. No. 11/994,604, Non-Final Office Action dated Sep. 24, 2014.

* cited by examiner

SYSTEM COMPRISING AT LEAST A MASTER UNIT AND A PLURALITY OF SLAVE UNITS

TECHNICAL FIELD OF THE INVENTION

The invention relates to a system comprising at least one master unit and a plurality of slave units, said master unit and at least one of said slave units comprising means for performing preferably two-way communication via radio frequency channels, wherein said at least one master unit comprises means for transmitting control signals to said slave units, said slave units each being provided with a unique address and each being associated with a controllable device.

BRIEF DISCUSSION OF RELATED ART

In control systems of the of the above-mentioned type it is usually a time-consuming and confusing job for the user to perform a set-up of a system wherein a remote control is used for operating a plurality of devices.

In the prior art, systems have been described by means of which an enhanced user-friendliness has been aimed and achieved. An example of such a system is described in EP 1 340 198 B1, wherein a number of units may be associated with a remote control during an initial configuration procedure. After this, a group configuration may be performed, where the units may be selected one by one and assigned to a certain group. It will be understood that since all units are that has to be allocated to a group, must be handled individually, the procedure may be time-consuming if many units are involved in the process.

BRIEF SUMMARY OF THE INVENTION

The invention provides a system which is user-friendly, also as regards the initial set-up procedure, and by means of which it will be easy to establish a well-performing system, which is easy to operate, with undue effort.

Further, the invention provides such a system that does not require special skills from the user in order to arrange the operational facilities.

The invention also provides such a system by means of which is easy to change an already set-up of the system and which further allows the user to handle a system comprising a plurality of controllable devices in an effortless manner.

The invention also provides such a system by means of which the navigation between different devices is uncomplicated and motivating for the user, e.g. motivates the user to take full advantage of the features presented by the various devices.

Still further, the invention provides such a system by means of which the everyday comfort of the user is enhanced.

The invention relates to a system comprising at least one master unit and a plurality of slave units, said master unit and at least one of said slave units comprising means for performing communication via radio frequency channels, wherein said at least one master unit comprises means for transmitting control signals to said slave units, said slave units each being provided with a unique address and each being associated with a controllable device, and wherein said at least one master unit comprises means for configuring said slave units addressable by said master unit in a number of sectors, wherein said master unit further has means for allocating predefined identifications to said slave units, and wherein said master unit has display means, by means of which said predefined identifications may be displayed.

Hereby it is achieved that the system may be configured by the user in a manner allowing operations to be performed in a user-friendly manner, while also giving the user ample information and overview of the possibilities presented by the system/master unit as regards operation of the devices associated with the slave units.

According to an advantageous embodiment, said master unit may be designed for performing an auto-configuration, by means of which communication with said slave units is established sequentially, addresses and properties are stored and arranged in a predefined manner by said master unit.

Hereby it is achieved that all slave units that are accessible by the master unit, may automatically be contacted by the master unit and addresses, properties etc. may automatically be registered in a storage facility of the master unit. The properties, that may be registered, may for example be the type of the device associated with each slave unit, e.g. a window operator/opener, a Venetian blind, a roller curtain, a shutter, etc.

According to an advantageous embodiment, said predefined manner, in which said slave units may be automatically arranged, may comprise a arrangement in consideration of the property of the device associated with the slave unit, in such a manner that slave units having similar properties are arranged in a consecutive manner, e.g. with a unique identification comprising a label and a number.

Hereby it is achieved that all slave units are automatically arranged in a logic manner, e.g. all window operators listed with a label such as "Window" or "Window operator" and with a number, e.g. the numbers 1-n, by means of which the user may address the individual operators.

According to a further advantageous embodiment, said master unit may be configured for facilitating a naming and/or re-naming of slave units and/or sectors such as for example groups, rooms, zones etc.

Hereby, a further enhanced user-friendliness is obtained, since the user may relatively easy use names, labels etc, that obviously informs the user of e.g. the nature or property of e.g. a device or a group that is selected. For example, the user will be able to rename the devices that are automatically named e.g. "Window operator 2" into "Kitchen window operator" etc. by means of the functions of the master unit, whereby the use of the master unit will be straightforward. Similarly applies for groups, rooms, zones etc, where for example "Room 3" may be renamed into "Living Room", etc.

According to a still further advantageous embodiment, said master unit may be configured for establishing a group comprising all slave units of a of a specific type when at least two slave units of said specific type have been registered in a sector.

Hereby, it is achieved that as soon at least two similar devices, for example to window operators, have been registered, a group comprising these devices are created under e.g. the label of "All Window Operators". Hereby the user will automatically be presented with the option of being able to e.g. close all windows with one simple keypad operation. Further, it is noted that the facility of establishing such "All"-groups are dynamic, e.g. if for example the units with the label "Window Operator" are divided into two groups, such an "all" group will be established for each of these, if at least two window operators are placed in such a group. Further, it is also possible to create a group comprising devices that are dissimilar, for example a group comprising e.g. blinds and roller shutters, which may then be operated simultaneously, for example in order to shield from the sunlight.

Advantageously, said sectors may be associated with a locality, e.g. a room or part of a room in a house, an apartment etc., and slave units located at said locality may be arranged in said sectors.

Hereby, the system may be arranged in accordance with the specific needs of the user and in accordance with the specific premises and locations.

According to a further advantageous embodiment, at least one of said sectors may be associated with a room, i.e. one or more slave units of any type located in said room.

Hereby the option of being able to arrange the units in a logic manner is provided, whereby a user may at an operating level select a specific "Room", where after only the units that are located in said room and available for control are displayed e.g. in scrollable form on the master unit.

According to a still further advantageous embodiment, at least one of said sectors may be associated with a room and may consist of at least two slave units of one or more specific types.

Hereby a further advantageous option is made available, since it will be possible in a specific room to specify a group consisting of units of the same type or of mixed types, whereby it will be possible to operate these units in a convenient manner. For example, it will in this manner be possible to crate a group consisting of the blinds in the windows facing e.g. south, whereby e.g. the simultaneous closing of these blinds when the sun is shining is made possible. It is noted that such a user-specified group normally will contain less than the number of said units of said type in the room, since a group consisting of all these units of the same type will normally have been established automatically by the master unit. Thus, a group comprising "All" units of a specific type will be available when a room is selected.

According to a still further advantageous embodiment, at least one of said sectors may be associated with a plurality of rooms and may comprise at least two slave units of one or more specific types.

Hereby, an advantageous option has been created for the user, since it in many instances will be necessary or preferable to be able to operate a number of controllable units at the same time, which units are placed e.g. in different rooms. For example, it may be advantageous to close or open all blinds in windows facing the sun, which windows may be located in different rooms. It is further noted that it will also be a possibility to create groups that comprise units from such a zone.

Preferably, said control signal transmitted to at least one of said slave units may in addition to an address comprise information related to the type of operation, e.g. open/close, increase/decrease, information related to a ratio, e.g. 60%, or a predefined level, presetting or the like.

Preferably, said master unit may comprise timing means for facilitating delayed or real-time execution of said transmission of control signals.

Hereby, it is achieved that a time-dependent execution of operations may be performed, e.g. the sequential transmission of control signals may comprise a control signal transmitted to e.g. a window operator 30 minutes after activation of the function control key in order to achieve that the window is opened for example 25%, and after yet e.g. 10 minutes a subsequent control is transmitted ordering the window operator to close the window fully. Such a timing function may be based on a real-time function or may be based on a facility measuring lapsed time only.

According to a particular advantageous embodiment, said master control may be designed in order to transmit an additional control signal, requesting a status report from the slave unit in question, and wherein the slave unit may calculate a transmission time for said additional control signal in consideration of said information related to a ratio.

Hereby it is achieved that the system may be designed in a cost-efficient and effective manner, e.g. with relatively limited resources as regards computational power, communication activity etc., since the system will not be burdened with control and request signals sent with very small time intervals. Instead, a control signal requesting a status, e.g. in order to conform that the requested action has taken place, will be transmitted normally only once and at a time when it is expected that the required action has been fully executed. The slave unit will have calculated or estimated the time that the slave unit will need to perform the requested operation, e.g open to 80%, and this information is transmitted to the master unit, for example with the acknowledgement signal. Thereby, the required power for operating the system is also reduced, thus also optimizing the battery requirements for e.g. the master unit. Further, the activity on the channels available for the communication will also be reduced to a minimum, thus allowing other units to communicate efficiently.

Preferably, said slave units may be configured for providing feedback to the master unit upon completion of an operation, e.g. operation succeeded or failed, the status of the device, e.g. 40% open etc.

Hereby, it is achieved that the user may be informed of the result of the actuation, also in cases where the user is not present in the vicinity of the devices that are operated, e.g. for example if it is selected that a group or all windows should be closed. Further, this facility may serve also for providing status information regarding the respective devices, e.g. in case the user wants to make sure that all windows have been closed before going to bed or that all doors are locked.

In a further advantageous embodiment, said feedback may be limited to feedback relating to non-executed operations.

Hereby, it is achieved that the user is provided with the information that is highly relevant for the user. For example, in case a group of blinds have been commanded to close 100%, it would not serve the interest of the user to receive one brief message after the other concerning the specific blinds. Instead, if one or more operations fail, a message is provided to the user informing him/her that e.g. two blinds have failed. Hereafter, the user may select these two blinds and be informed that e.g. the first has not been fully closed and that contact has not been established with the other one.

According to a particular advantageous embodiment, said master unit may be configured for performing a data transfer to a similar additional master unit, said data transfer in addition to addresses of slave units includes labels, configuration of the slave units in sectors, e.g. groups, rooms and zones, and other user-defined settings.

Hereby, it is achieved that renaming of operators, rooms etc. and the sector configurations that have been established by the user, may relatively easy be copied into an additional remote control, thereby sparing the user the effort of repeating the operating steps and also ensuring that the contents of the master units correspond to each other.

Preferably, said master unit may be configured for facilitating an editing of the configuration of the slave units in sectors, e.g. groups, rooms and zones, and other user-defined settings.

Thereby, it is achieved that in case a mistake has been made during the creation of e.g. a "room", it will not be necessary to start from the beginning again. Further, the addition of newly installed devices is also facilitated hereby.

According to a further advantageous embodiment of the invention, said master unit may be configured for operating in a predestined mode, wherein slave units and/or sectors, e.g. groups, relating to a specific locality, e.g. room, may be selected for operation.

Hereby, it is achieved that if the user possesses a plurality of master units, (some of) these may be placed in room, where they are often used, and they may be arranged to be ready to select e.g. controllable devices located in such a room. Thus, the user will not need to use time to find the correct room, but may immediately select and operate the respective devices, thereby contributing to the user-friendliness and comfort of the user.

Preferably, said master unit may be configured for operating slave units and/or sectors, e.g. groups, relating to other localities also, e.g. rooms, but that the master units returns automatically to the predestined units and/or sectors.

Hereby, it is achieved that the master unit will be universally useable, but that it will automatically return to the mode, wherein the user may readily find and operate the units, groups, etc. relating to the specific room.

Advantageously, said master unit may be configured for operating only slave units and/or sectors, e.g. groups relating to a specific locality, e.g. room, in said predestined mode. Hereby, it is achieved that the use of such a specific master unit will be straightforward, and that even persons that are not accustomed to such systems, may operate these without problems.

BRIEF DESCRIPTION OF THE SEVERAL FIGURES

The invention will be explained in further detail below with reference to the figures of which

DETAILED DESCRIPTION OF THE INVENTION

Figures 1, 1A:
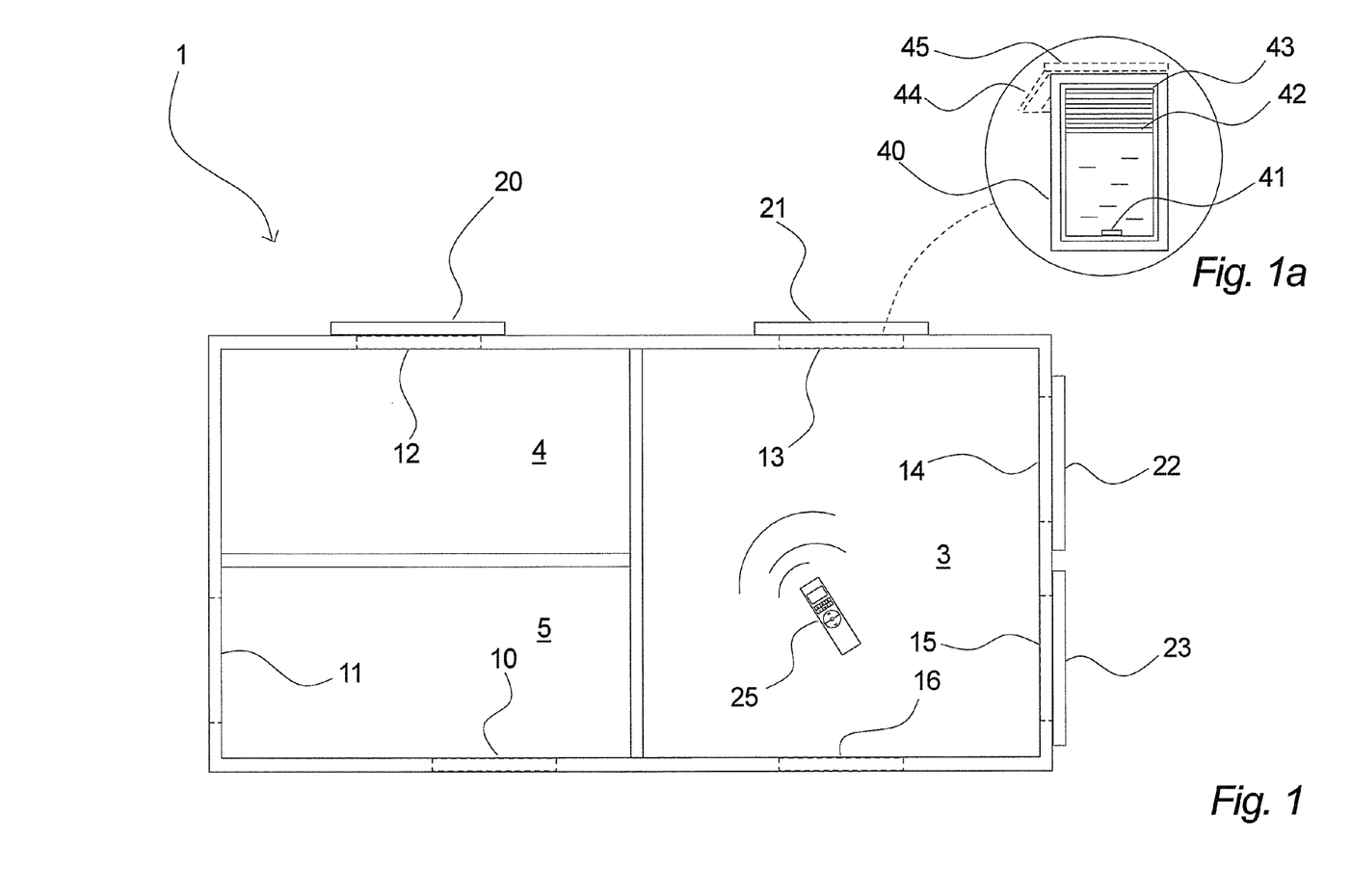
FIG. 1 shows in a schematic manner a control system comprising a number of controllable devices in a house or a building.
FIG. 1a shows in an enlarged view an illustration of controllable devices that may be associated with a window.

An example of a control system according to an embodiment of the invention, e.g. a home automation system or part thereof, is illustrated in FIG. 1. Here, a building, a house, an apartment or the like 1 is illustrated in a schematic manner, wherein a number of devices, e.g. equipment and fittings, which are controlled by a system in accordance with the invention, are furthermore illustrated in a general manner.

The house or apartment 1 may comprise a number of rooms, for example the rooms 3, 4 and 5, and in these rooms a number of windows 10, 11, 12, 13, 14, 15 and 16 may be located. Further, some of these windows may be provided with awnings 20, 21, 22 and 23 as also illustrated. It will be understood that these pieces of equipment are only examples of devices that may be controlled by means of the system, e.g. by means of one or more remote controls 25. Such remote controls are also referred to as master units in the following.

Thus, it will be understood that a window 40 may as shown in FIG. 1a comprise e.g. a window actuator, operator or opener 41, a Venetian blind 42 that may be operated by drive means 43 and an awning 44 placed outside the window and operated by drive means 45.

Other examples of devices and equipment that may be controlled by such a system are motorized shutters, blinds and curtains, garage doors, roof windows, heating and cooling systems, alarms, lighting equipment, locks etc.

The devices, equipment etc. that are controlled by means of the system, are associated with slave units, e.g. means for receiving control signals from the remote control(s) 25 and for operating in accordance with received signals. Such means may comprise radio frequency receiving and transmitting means, although it will be understood that some devices may be connected by e.g. a wire bus that may serve to transmit signals from a common RF receiver to the respective slave units associated with the respective devices etc.

Figure 2:
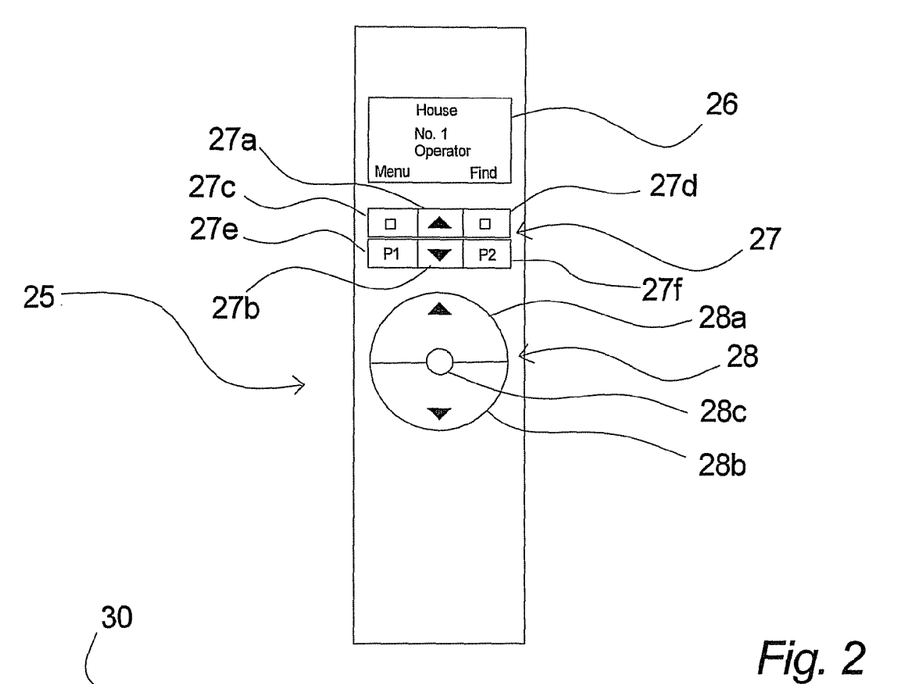
FIG. 2 shows an embodiment of a remote control or master unit in accordance with the invention.

An example of a remote control or master unit 25 is shown in further detail in FIG. 2. This remote control comprises RF receiving and transmitting means, a power source such as a battery, storing means, control means etc., and further as shown in FIG. 2, the remote control comprises operating means in the form of a display 26, an operating keypad 27 for e.g. displaying information on the display 26, for selecting options, devices etc. and control keys 28 for e.g. operating a selected device.

When a system according to the invention has been installed, an initial set-up or configuration must be performed, whereby an automatic registration of the devices is performed. This is initiated by means of the remote control 25, e.g. by inserting batteries in the remote control 25, where after the user is instructed to switch on the mains power to the devices and operate a key, corresponding to e.g. a "Ready"-symbol on the display, on the keypad 27 in order to indicate to the remote control, that an auto set-up may be executed.

During this, a unique code in the remote control is transmitted to all remote-controlled devices, e.g. slave units that are in proximity of the remote control 25 communication-wise. In accordance with a predefined procedure, e.g. as described in EP 1 340 198 B1, the slave units will during this procedure transmit a response signal to the remote control 25, containing information in the form of an address and the type of the slave unit, e.g. a window operator, an awning, blinds etc.

The exchange of addresses and of the code may take place by the exchange of an address and of the code being completed between one slave unit and the master unit/remote control 25 before carrying out the exchange between the following slave units and the remote control and this initiation process may continue sequentially until the last of the slave units has transmitted its address and type and has received the code. The sequence of configuration of the respective units may be determined in various ways and may e.g. be determined by the units being susceptible to the initiation signal at different time intervals which may be mutually independent and potentially randomly divided between the units. The unit with which the susceptible time interval and an initiation signal first coincide will thus be configured first etc.

When the auto configuration has been completed, e.g. signalled by an icon for auto set-up on the display 26 and a message on the display 26, the system is ready for operation. The remote control 25 has now stored a list of devices including the address for each and the type, e.g. window operator, blind, awning light etc.

Furthermore, the master unit is configured for arranging the slave units or devices, which have now been associated with the master unit, in such a manner that the slave units are shown in a list on the display 26 assembled in accordance with the type of equipment and with a numbering, e.g. showing first window operator no. 1-7, blind no. 1-5, awning no. 1-4 etc. The user may scroll up and down this list, e.g. using the navigation keys 27a and 27b, until a device is found and selected, in which case the device may be operated by means of the keys 28a, 28b and 28c.

However, the user will be able to rename these devices, e.g. renaming "Window operator 2" into "Kitchen window operator" etc. by means of the functions of the master unit 25. Such a renaming can also be made for other labels that are created automatically by the system, e.g. groups, zones, rooms etc. that may be relabelled into appropriate names allowing the user to readily realize what has been selected on the master unit.

In order to make the operation of the system easy and logic, the master unit 25 facilitates a division into e.g. groups of the available controllable units, which will be further explained in the following.

Figure 3:
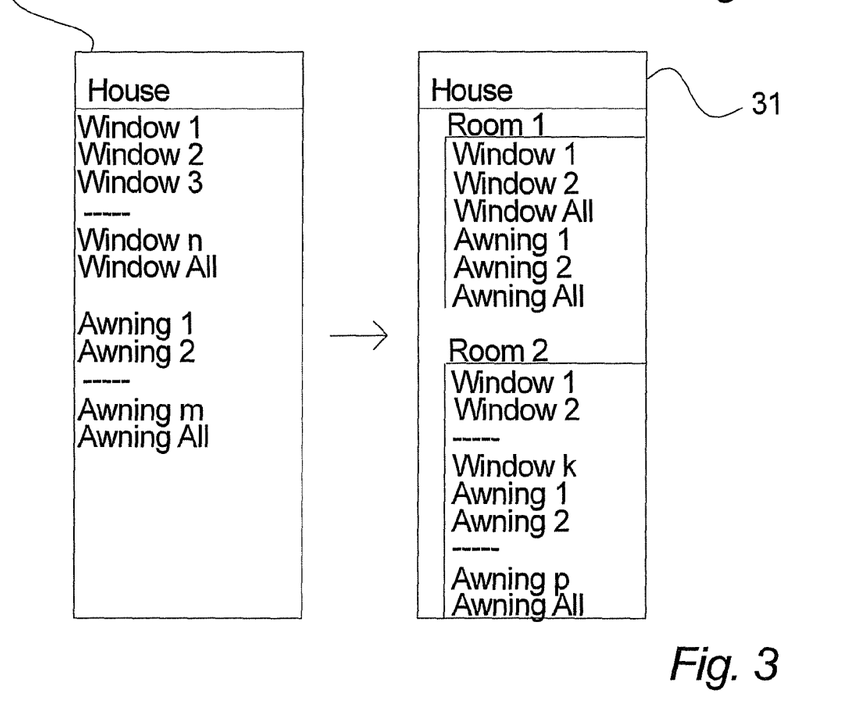
FIG. 3 illustrates the establishing of rooms in the control system.

As long as the available controllable units are arranged as described above the display means 26 of the master unit will involve only two levels, i.e. "House", which, when selected, will be replaced by the list of all units, or, if a "Find" command is used, the desired type can be found before going into the number-level. This is illustrated in FIG. 3, where the box 30 represents this arrangement of the available units. Here, it is also shown that when more than two units of the same type is present, the master unit has automatically created a "All"-group, for example "All window operators".

First, a room may be defined, for example the room 3 in FIG. 1.

This may be done by selecting e.g. a "Menu", and here select a menu-item, where a sector such as e.g. a room can be created. Here, the individual units may thus be selected and allocated to the room, i.e. by pressing the key 27c to enter the unit in the "room". It is noted that when a device or unit is selected, it is possible to observe which unit has been selected by pressing the control keys 28 for a brief period of time. Further units can be selected and added to the "room" as described, until the "room" is finally stored as e.g. "Room 1". This is illustrated in FIG. 3 with the box 31.

When a room has been created, the master unit will offer to save all remaining units in a room, e.g. "Room 2" as show in FIG. 3, or, if this is refused, the display will return to the list from which remaining products/units can be selected for a new room, etc. It is noted that when units has been selected for a room and the room is stored, the units are automatically renumbered as also indicated in FIG. 3.

As explained, a "Room" may comprise the controllable units in a specific room, for example the room 3 in FIG. 1. Here, the window operators 13-16 are selected, the awnings 21-23 and, if other types of equipment are provided, for example blinds, roller shutters, light etc, these may be included as well. When the room has been established, which as explained above means that at least one more "room" is created, the master unit may now involve one more level. When "House" is selected, it will according to this embodiment be possible to choose between e.g. "Room 1" and "Room 2" as illustrated with the box 31 in FIG. 3. Here after, it will be possible to select all units of a certain type or it will be possible to scroll between the units in the room.

Figure 4:
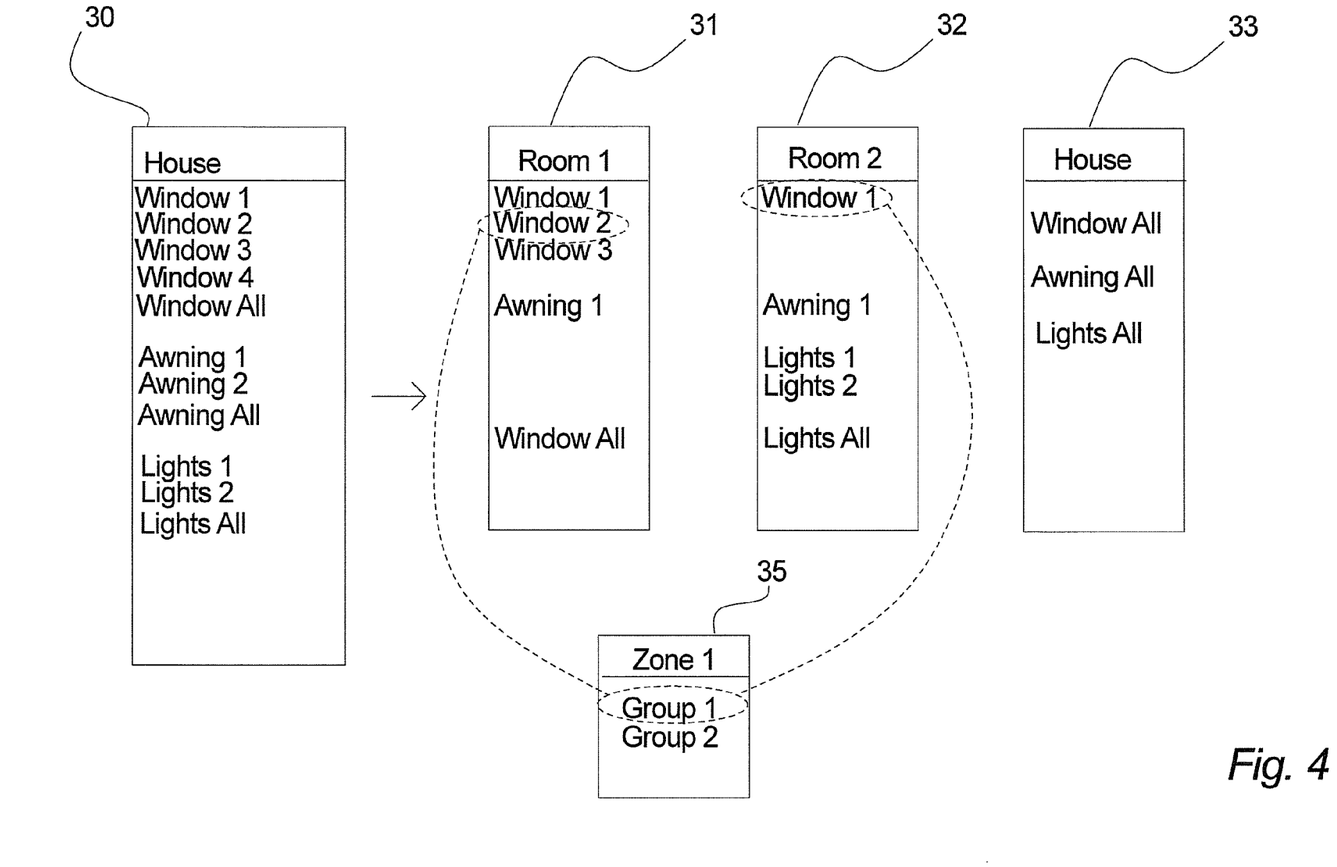
FIG. 4 illustrates further the establishing of rooms, groups, zones etc. in the control system.

Another manner of arranging the division of controllable devices into sectors are illustrated in FIG. 4.

After the initial auto-configuration a listing as shown at 30 will be available to the user, comprising four windows, three awnings, two lights and further three "all"-groups.

The user now creates a room, "room 1", as shown at 31 comprising three windows and one awning. As mentioned above, an "all" group is also automatically created when the room is stored. Further, the remaining devices are assigned to a "room" as shown at 32. Now, when the user wants to operate the devises, the user may select "room", in which case he/she will be able to select one of the two rooms and subsequently the devices and group(s) comprised in the room.

Furthermore, it will be possible for the user instead to choose the "house" as indicated at 33, comprising the "all"-groups for selection of the group or subsequently the individual items, in which case the user will be presented with the option of selecting a particular type of device and a specific one of these devices etc.

However, the creation of a sector in the form of a zone is also illustrated in FIG. 4. A zone may be defined as a group that is created across the already defined rooms.

If for example the user selects e.g. "window 2" from "room 1" and "window 1" from "room 2" and wishes to create a group consisting of these, a zone 35 will be created, e.g. "zone 1", which comprises a group, "group 1" consisting of the two windows.

As mentioned above, such a zone may be renamed, for example into "south zone", whereby the windows in "group 1" will be identified as the windows placed in this zone.

Figure 5:
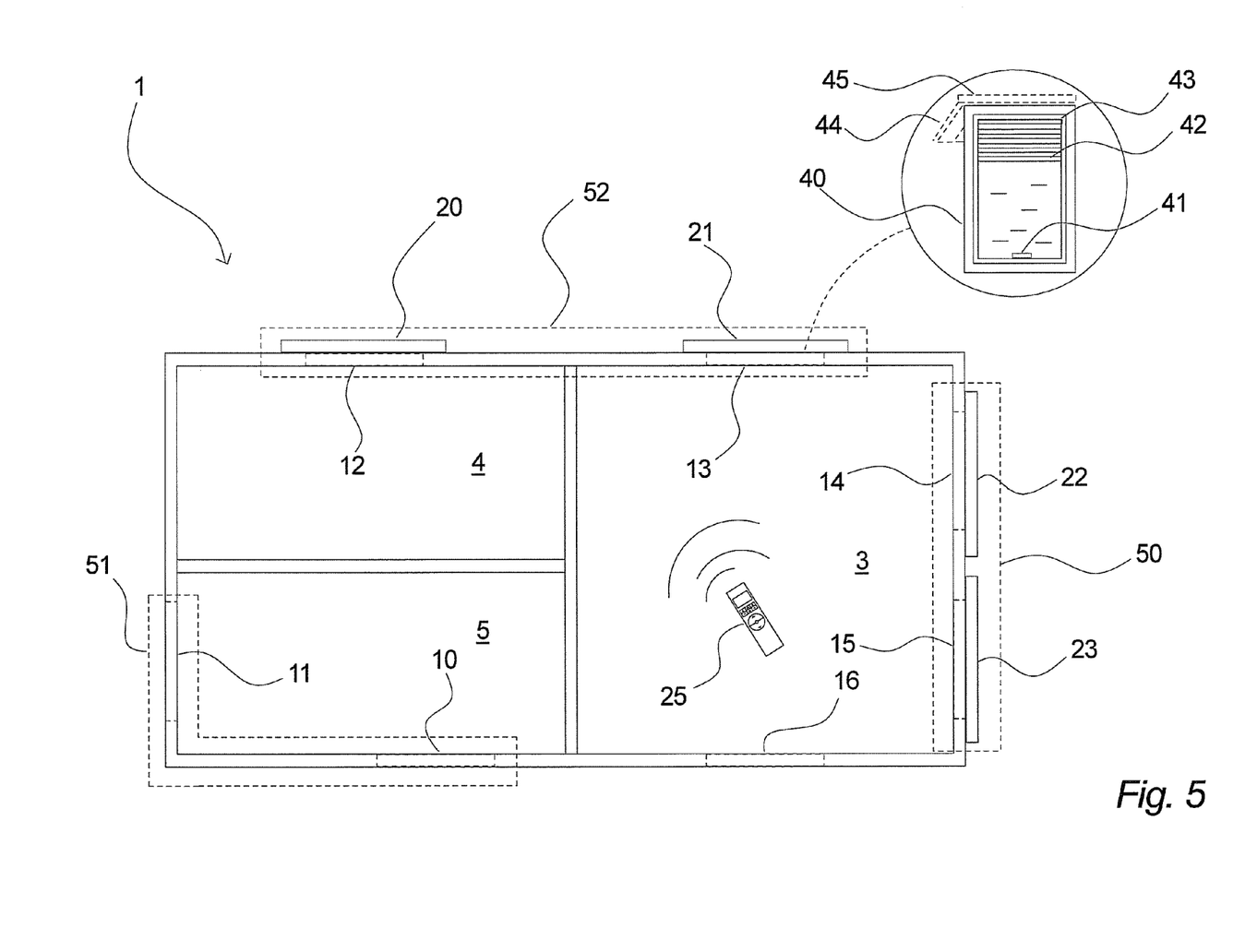
FIG. 5 shows the control system illustrated in FIG. 1, but further illustrating the division of the controllable devices in sectors corresponding to "rooms", "groups" and "zones

As shown in FIG. 5, it may further be possible to create a group consisting of a number of units of the similar or dissimilar type in a specific room, for example a group 50 consisting of the awnings 22 and 23 in the room 3 or a group 51 consisting of the window operators for the windows 10 and 11 in the room 5.

As further shown in FIG. 5, it is possible to create a special grouping which as also mentioned above will be referred to as a "zone" for the purposes of this application. Such a zone may comprise units of the same type or of different types, but located in different "rooms", or rather the groups defined in such a zone will comprise devices located in different "rooms". This is illustrated in FIG. 5 with the zone 52 consisting for example of the awning 20 located in the room 4 and the awning 21 in the room 3.

When such a zone has been created, it is made possible to operate these devices simultaneously, for example the awnings located at the south-facing wall. It should be mentioned that zones may not only cover different rooms in the same level, but also rooms at different levels, for example in a house having a ground floor and a first floor, e.g. an attic.

As previously mentioned, it is possible to perform a renaming of the devices registered with the master unit. For example, when "room 1" shown in FIG. 4 has been created, the three windows will be numbered 1, 2 and 3. However, it is quite possible that "window 3" is situated between the two others, which may be confusing. Window 3 may be selected for renaming, e.g. into "window 2", in which case the former "window 2" takes the available place as "window 3".

The master unit is designed for facilitating an editing of the programming, renaming etc. that the user has performed. Thereby, it is achieved that in case a mistake has been made during the creation of e.g. a "room", it will not be necessary to start from the beginning again. Further, the addition of newly installed devices is also facilitated hereby.

Further, the master unit can be configured for performing a data transfer to a similar additional master unit, whereby data such as addresses of slave units, labels, names, configuration of the slave units in sectors, e.g. groups, rooms and zones, and other user-defined settings are transferred to another master unit or remote control 25. Hereby, the user is spared the effort of repeating the necessary operating steps. Further, it is ensured that the contents of the master units matches each other.

When using the master unit for operating the slave units, the slave units may provide feedback to the master unit when an operation is completed. Such a feedback may be e.g. operation succeeded or failed, the status of the device, e.g. 40% open etc. Hereby, it is achieved that the user may be informed of the result of the actuation, also in cases where the user is not present in the vicinity of the devices that are operated, e.g. for example if it is selected that a group or all windows should be closed. Further, this facility may serve also for providing status information regarding the respective devices, e.g. in case the user wants to make sure that all windows have been closed before going to bed or that all doors are locked.

In particular when a plurality of operations have been initiated, for example a group that has been commanded to perform an operation or a programme is being executed, the feedback may preferably be limited to feedback relating to non-executed operations. For example, in case a group of blinds have been commanded to close 100%, it would not serve the interest of the user to receive one brief message after the other concerning the specific blinds. Instead, if one or more operations fail, a message is provided to the user informing him/her that e.g. two blinds have failed. Hereafter, the user may select these two blinds and be informed that e.g. the first has not been fully closed and that contact has not been established with the other one.

It is further noted in this respect that the master unit is provided with a display 26 and means for using icons, pictures, pictograms, graphic illustrations etc, instead of or in addition to text messages in order to enhance the user-friendliness and increase the intelligibility.

Figure 6:
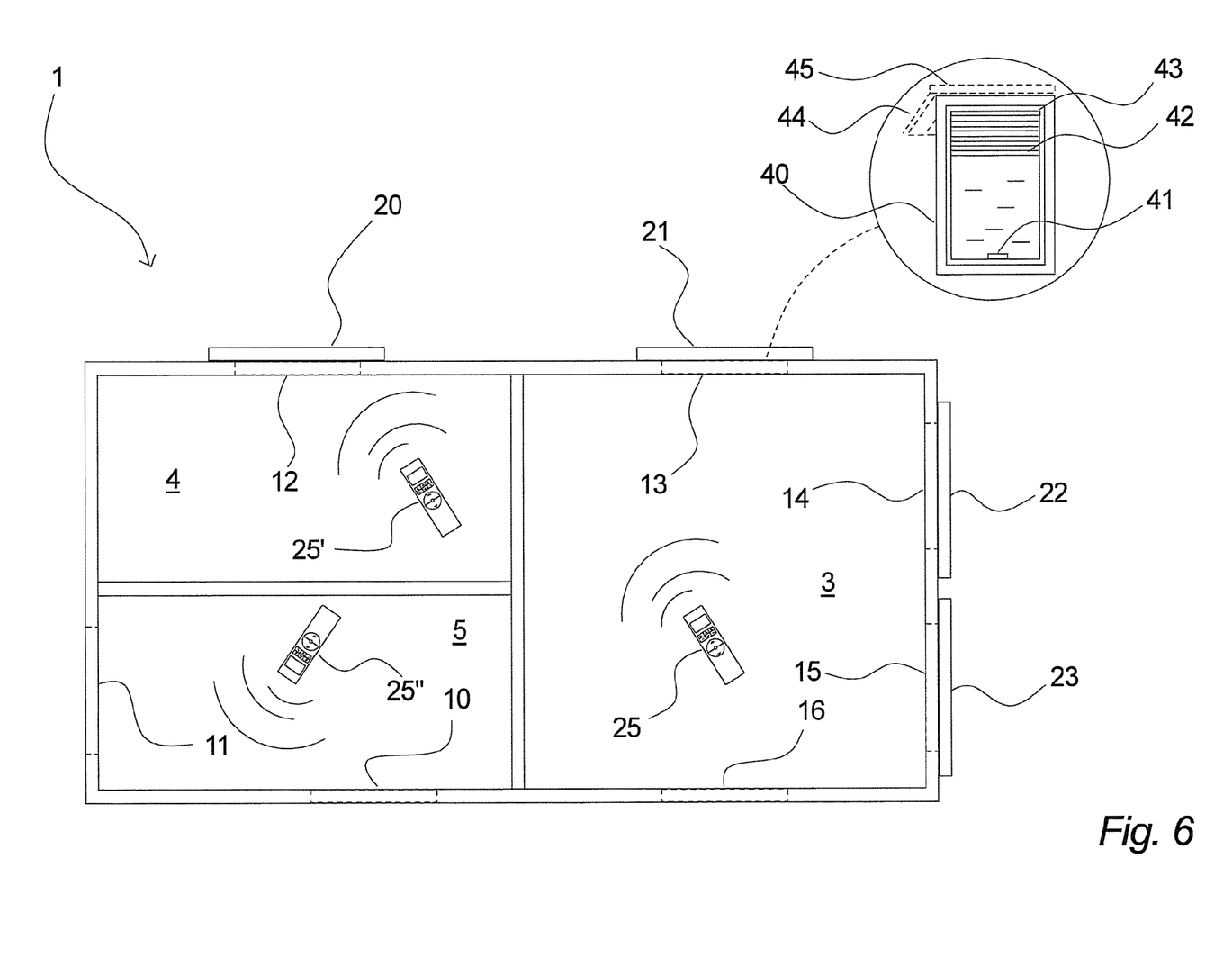
" and FIG. 6 shows a control system as illustrated in FIG. 1, but with a plurality of master units in order to illustrate a further aspect of the invention.

A further aspect of the invention will now be described with reference to FIG. 6, which corresponds to FIG. 1. As explained above, the system may comprise a plurality of master units, e.g. 25, 25' and 25" as shown in FIG. 6. These may all be similar as regards the registered addresses of slave units including names, configuration of the slave units in sectors, e.g. groups, rooms and zones, and other user-defined settings, since it is possible, as already explained, to perform a data transfer from one master unit to another. If the user has such a number of master units, the user will obviously place one in each room, at least in "major" rooms, where the master unit is needed mostly. In such cases it is possible to arrange a setting of each master unit in such a manner that e.g. the master unit 25 will be ready for selecting units or groups located in room 3 (e.g. the display will show e.g. "Room 3"), the master unit 25' will be ready for selecting units or groups located in room 4, and the master unit 25' will be ready for selecting units or groups located in room 5.

Furthermore, the master units may be configured in such a manner that it will only be possible to operate units, groups, etc. that are placed in or related to said room with the respective master units. But they may also be configured in such a manner that they may be used for operating other units, groups, etc. In the last case, when it is desired to operate e.g. a window in another room, the other room may be selected, the window may be found and operated. When the master unit here after is left, it will automatically return to the room, to which it is assigned, e.g. after a predetermined time the display will again show e.g. "Room 3" or "Bedroom" as the case may be. Thus, the user will not need to use time to find the correct room, but may immediately select and operate the respective devices, thereby contributing to the user-friendliness and comfort of the user.

It will be understood that the invention is not limited to the particular examples described above and illustrated in the drawings but may be modified in numerous manners and used in a variety of applications within the scope of the invention as specified in the claims.

The invention claimed is:

1. A system comprising at least one master unit and a plurality of slave units, said master unit and at least one of said slave units comprising means for performing communication via radio frequency channels, wherein said at least one master unit comprises means for transmitting control signals to said slave units, said slave units each being provided with a unique address and each being associated with a controllable device, and wherein said at least one master unit comprises means for configuring said slave units addressable by said master unit in a number of sectors, wherein said master unit further has means for allocating predefined identifications to said slave units, wherein said master unit has display means, by means of which said predefined identifications are selectively displayable on said display means, and wherein said master unit is designed for performing an initial auto-configuration to perform an initial automatic registration of at least a subset comprising a plurality of said slave units said initial auto-configuration comprising that communication with said at least a subset of slave units is established sequentially in an automated manner, whereby addresses and properties for said at least a subset of slave units are stored and arranged in a predefined manner by said master unit; wherein said master unit is configured for facilitating a naming and/or re-naming of slave units and/or sectors; and wherein said master unit comprises timing means for facilitating delayed or real-time execution of said transmission of control signals; and wherein the controllable device is a window operator, a window actuator, a window opener, a drive, a blind, a motorized shutter, curtains, garage doors, roof window, heating systems, cooling systems, alarms, lighting equipment, locks, an awning or an awning light.

2. The system according to claim 1, wherein said predefined manner, in which said slave units are automatically arranged, comprises an arrangement in consideration of the property of the device associated with the slave unit, in such a manner that slave units having similar properties are arranged in a consecutive manner.

3. The system according to claim 1, wherein said master unit is configured for establishing a group comprising all slave units of a of a specific type when at least two slave units of said specific type have been registered in a sector.

4. The system according to claim 1, wherein said sectors may be associated with a locality and slave units located at said locality may be arranged in said sectors.

5. The system according to claim 4, wherein at least one of said sectors is associated with a room and one or more slave units of any type located in said room.

6. The system according to claim 5, wherein at least one of said sectors is associated with a room and comprises at least two slave units of one or more specific types.

7. The system according to claim 4, wherein at least one of said sectors is associated with a plurality of rooms and comprises at least two slave units of one or more specific types.

8. The system according to claim 1, wherein said control signal transmitted to at least one of said slave units comprises in addition to an address and information related to the type of operation, information related to a ratio, or a predefined level or presetting.

9. The system according to claim 1, wherein said master unit is designed in order to transmit an additional control signal, requesting a status report from the slave unit in question, and wherein the slave unit calculates and transmits to the master unit a transmission time for said additional control signal in consideration of information related to a ratio.

10. The system according to claim 1, wherein said slave units are configured for providing feedback to the master unit upon completion of an operation.

11. The system according to claim 10, wherein said feedback is limited to feedback relating to non-executed operations.

12. The system according to claim 1, wherein said master unit is configured for performing a data transfer to a similar additional master unit, said data transfer in addition to addresses of slave units includes labels, configuration of the slave units in sectors, and other user-defined settings.

13. The system according to claim 1, wherein said master unit is configured for facilitating an editing of the configuration of the slave units in sectors.

14. The system according to claim 1, wherein said master unit is configured for operating in a predestined mode, wherein slave units and/or sectors relating to a specific locality may be selected for operation.

15. The system according to claim 14, wherein said master unit is configured for operating slave units and/or sectors relating to other localities but that the master units returns automatically to the predestined units and/or sectors.

16. The system according to claim 14, wherein said master unit is configured for operating only slave units and/or sectors in said predestined mode.

17. The system according to claim 1, wherein each of said sectors includes at least two slave units.

18. A system comprising at least one master unit and a plurality of slave units, said master unit and at least one of said slave units comprising means for performing communication via radio frequency channels, wherein said at least one master unit comprises means for transmitting control signals to said slave units, said slave units each being provided with a unique address and each being associated with a controllable device, and wherein said at least one master unit comprises means for configuring said slave units addressable by said master unit in a number of sectors, wherein said master unit further has means for allocating predefined identifications to said slave units, wherein said master unit has display means, by means of which said predefined identifications are selectively displayable on said display means, and wherein said master unit is designed for performing an initial auto-configuration to perform an initial automatic registration of said slave units, said initial auto-configuration comprising that communication with said slave units is established sequentially in an automated manner, whereby addresses and properties are stored and arranged in a predefined manner by
    said master unit; wherein said master unit is configured for facilitating a naming and/or re-naming of slave units and/or sectors; and wherein said master unit comprises timing means for facilitating delayed or real-time execution of said transmission of control signals; wherein said master unit further is designed in order to transmit an additional control signal, requesting a status report from the slave unit in question, and wherein the slave unit calculates and transmits to the master unit a transmission time for said additional control signal in consideration of information related to a ratio; and wherein the controllable device is a window operator, a window actuator, a window opener, a drive, a blind, a motorized shutter, curtains, garage doors, roof window, heating systems, cooling systems, alarms, lighting equipment, locks, an awning or an awning light.

\* \* \* \* \*